Nov. 22, 1932. J. S. COFFARO 1,888,308
CONVEYER FOR PRELIMINARY DRYING OF SHORT MACARONI
Filed Oct. 5, 1929 2 Sheets-Sheet 1
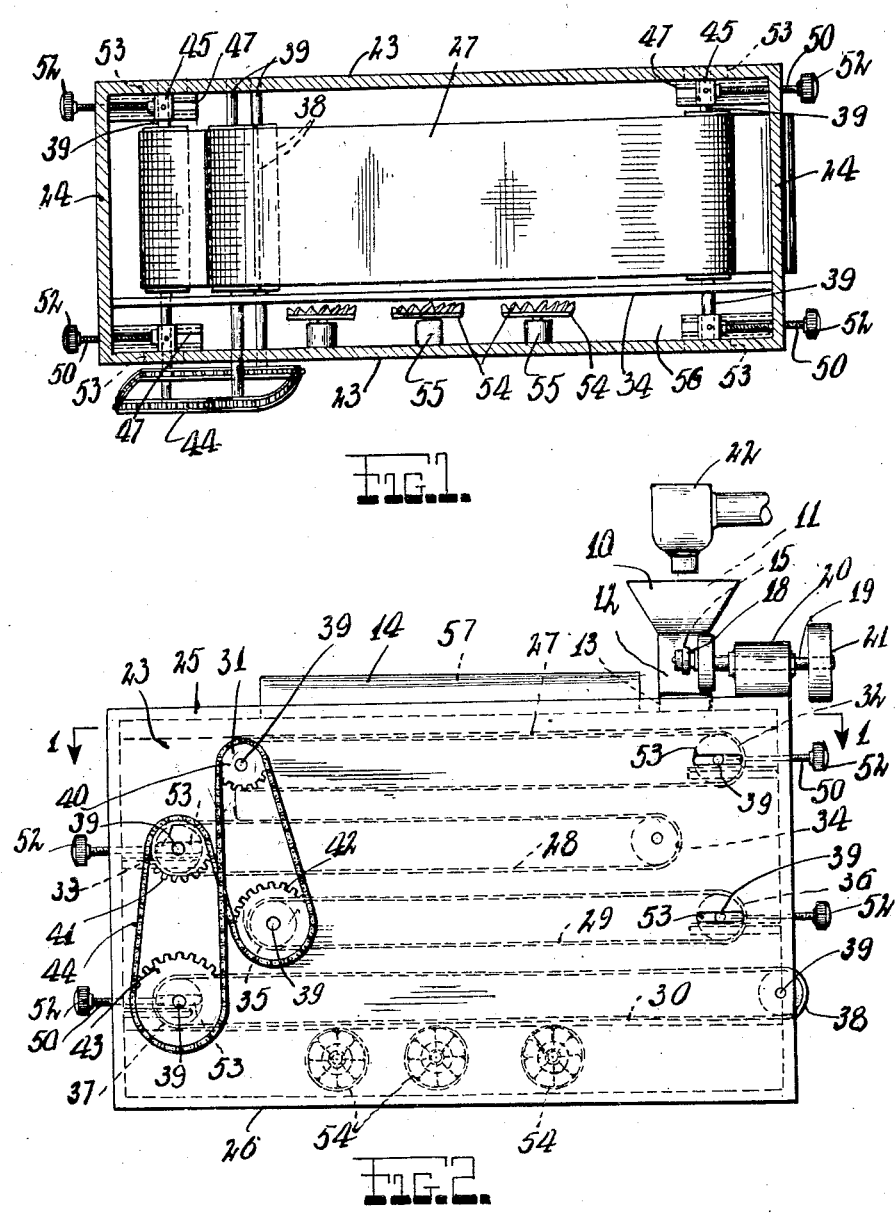
INVENTOR
John S. Coffaro
BY
ATTORNEY Nov. 22, 1932.　　　J. S. COFFARO　　　1,888,308
CONVEYER FOR PRELIMINARY DRYING OF SHORT MACARONI
Filed Oct. 5, 1929　　2 Sheets-Sheet 2
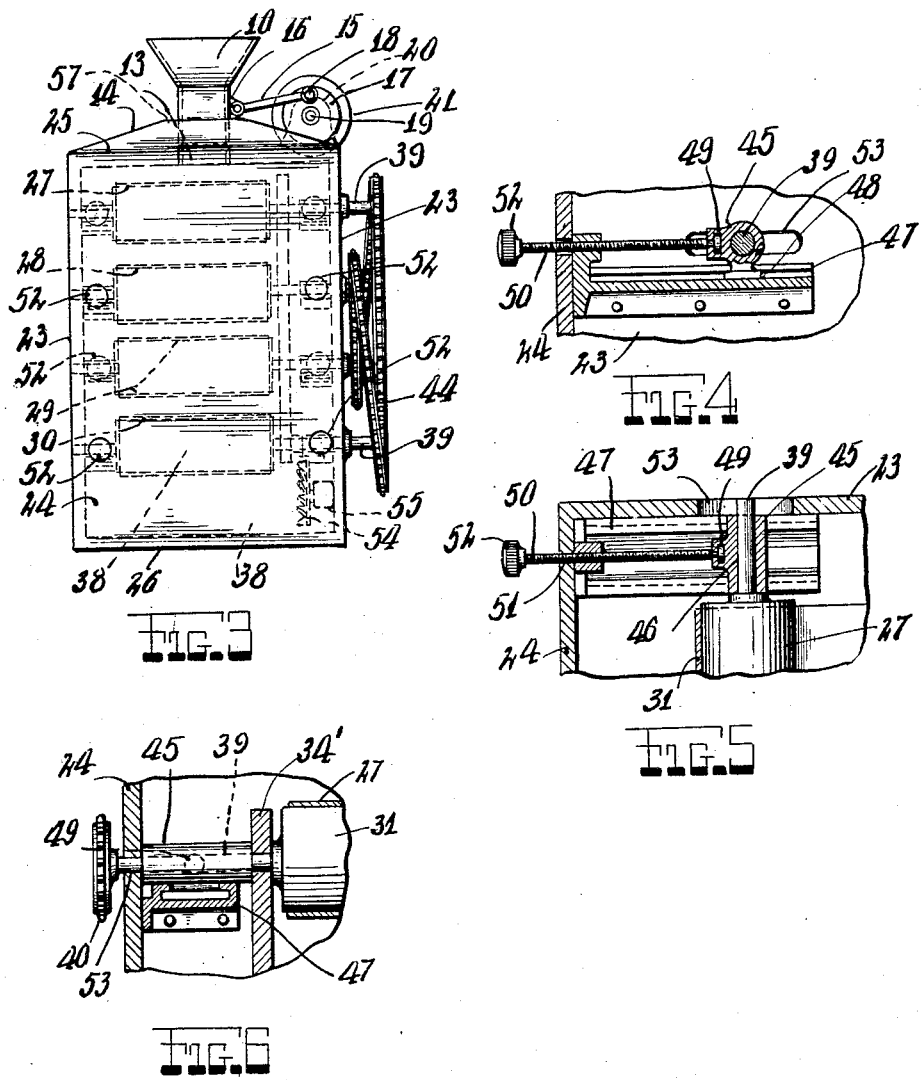
INVENTOR
John S. Coffaro
BY
ATTORNEY Patented Nov. 22, 1932

1,888,308

UNITED STATES PATENT OFFICE

JOHN S. COFFARO, OF BROOKLYN, NEW YORK, ASSIGNOR, BY MESNE ASSIGNMENTS, TO CONSOLIDATED MACARONI MACHINE CORPORATION, A CORPORATION OF NEW YORK

CONVEYER FOR PRELIMINARY DRYING OF SHORT MACARONI

Application filed October 5, 1929. Serial No. 397,718.

This invention relates generally to the manufacturing of macaroni, the invention having more particular reference to a novel type of machine used to dry the macaroni.

The object of the invention is the provision of an improved machine to dry short macaroni, of simple, efficient construction, and novel arrangement of parts.

For further comprehension of the invention, and of the objects and advantages thereof, reference will be had to the following description and accompanying drawings, and to the appended claim in which the various novel features of the invention are more particularly set forth.

Fig. 1 of the drawings, is a longitudinal sectional view of my improved macaroni drying machine, taken on the line 1—1 of Fig. 2.

Fig. 2 is a side elevational view of my improved macaroni drying machine.

Fig. 3 is an end elevational view thereof.

Fig. 4 is an enlarged vertical sectional view illustrating the conveyer belt tightening means.

Fig. 5 is a longitudinal sectional view thereof.

Fig. 6 is an end elevational view thereof, partly in section.

As here embodied my improved macaroni drying machine embodies a spreading device comprising a hopper 10, of hollow construction, provided with an upper opening 11, and a lower opening 12. The hopper 10, is slidably mounted in the elongated aperture 13, of the support 14, and is mechanically slid forward and backward in the elongated aperture 13 by the crank lever 15, which is pivotally attached at one extremity, as at 16, to the hopper 10, and at the other extremity to the disc 17, as at 18, which is attached at or near one extremity of the shaft 19, which is rotatively mounted in a bearing block 20, and has attached thereto a pulley 21.

The above described construction being such as will permit the macaroni, in process of manufacture, and cut to comparatively short lengths, when fed through the ejector 22, into the hopper 10, to be spread on the conveyer belt 27, when the pulley 21 is rotated or driven by a suitable belt extended over the pulley 21 and over a second pulley, not shown in the accompanying drawings, operatively driven or attached to a prime mover.

Referring in particular to the macaroni drying machine proper, which embodies a box, having sides 23, ends 24, top 25, and bottom 26, of any suitable size and dimensions, to accommodate conveyer bents 27, 28, 29, and 30, preferably number 4 mesh wire, extended over rollers 31 and 32, 33 and 34, 35 and 36, 37 and 38, respectively, attached to the shafts 39, which are rotatively mounted in the side 23 of the said box, and in the longitudinal partition 34', the said partition being conveniently located in the said box.

As a means of driving or operating the said conveyer belts, I have provided sprocket wheels 40, 41, 42, and 43, attached to the shafts 39 to which are attached the rollers 31, 33, 35, and 37, it being understood that the said sprocket wheels 40, 41, 42 and 43, having pitch diameters of increasing size, or are provided with increasing number of teeth, so as to drive the conveyer belts, 27, 28, 29, and 30, at different speeds, or at relatively decreasing speeds. It being also understood that the above referred to shafts 39, extend beyond the side 23 of the said box, and that the said sprocket wheels are attached thereto, outside of the said box. The sprocket chain 44 is extended over the sprocket wheels 40, 41 and 42, preferably looped, as clearly shown in Fig. 2, of the accompanying drawings, it being understood that the said sprocket wheels are suitably located on the said shafts 39, so as to permit the sprocket chain 44 to be looped, as above mentioned. It being further understood that a pulley may be attached to any one of the above referred to shafts 39, and that a suitable belt may be extended over the said pulley and over a pulley attached to a prime mover, the latter mentioned elements not shown on the accompanying drawings.

It will be clearly understood that the said conveyer belts are horizontally located, and so located or extended, that the macaroni, or sphaghetti, spread on the upper conveyer belt 27, as hereinbefore described, will be carried along the said conveyer belt 27 over the roller 31, and will then fall on the conveyer belt 28, and will be carried over the roller 34, and will then fall on the conveyer belt 29, and will be carried over the roller 35, and will then fall on the conveyer belt 30, and will be carried over the roller 38, and may then fall into a container or box, and be stored or packed for shipment.

It will be further understood that the relatively decreasing speeds of the said conveyer belts will cause the macaroni spread thereon, to be grouped in piles, when same has reached the above mentioned pulley 38.

As a means of tightening the said conveyer belts 27, 28, 29 and 30, I have provided pillow blocks 45, having suitable apertures to rotatively accommodate the said shafts 39, as at 46, the pillow blocks 45 being slidably mounted in the slides 47, as at 48, and having rotatively attached thereto, as at 49, the extremity of an adjusting screw 50, extending through the end 24, of the said box, and threadedly attached thereto, as at 51. It being understood that the slides 47 are rigidly attached to the side 23 and end 24, and that the knob 52 of the adjusting screw 50 is located outside the said end 24, and that the said side 23 is provided with elongated apertures 53, to permit the shafts 39 to be moved, or slid.

As a means of creating a draft or circulation of air over the macaroni being dried, I have provided suction blowers, comprising suitable fans 54, driven or rotated by electric motors 55, operatively connected by suitable wires to any convenient source of electric power, not shown on the accompanying drawings. The said suction blowers being located in the compartment 56 formed by the said partition 34, adjacent to the said conveyer belts 27, 28, 29 and 30, at or near the bottom of the said compartment 56, so as to create a draft or circulation of air through the opening 57 in the top 25 of the said box, and through the said conveyer belts, as shown by the indicating arrows 58, in Fig. 3 of the accompanying drawings.

Having thus described my invention, what I claim as new, and desire to secure by United States Letters Patent is:—

In a device of the class described, four conveyer units arranged in a vertical row, sprocket wheels fixed upon the left side of all the conveyer units, and means for rotating successive sprocket wheels in opposite directions comprising a sprocket chain engaging over the wheel of the first conveyer unit and extending down from the left side of the wheel and engaging under the wheel of the fourth conveyer and extending up from the left side of the wheel of the fourth conveyer and engaging over the wheel of the second conveyer and extending down from the right side of the wheel of the second conveyer and engaging under the wheel of the third conveyer and extending up from the right side of the wheel of the third conveyer and meeting itself at the wheel of the first conveyer.

In testimony whereof I have affixed my signature.

JOHN S. COFFARO.